US011929023B2

(12) United States Patent
Wang et al.

(10) Patent No.: US 11,929,023 B2
(45) Date of Patent: Mar. 12, 2024

(54) PIXEL CIRCUIT, METHOD OF DRIVING SAME, AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Xuanyun Wang, Wuhan (CN); Chao Dai, Wuhan (CN)

(73) Assignee: WUHAN CHINA STAR OPTOELECTRONICS SEMICONDUCTOR DISPLAY TECHNOLOGY CO., LTD, Wuhan (CN)

( * ) Notice: Subject to any disclaimer, the term of this patent is extended or adjusted under 35 U.S.C. 154(b) by 450 days.

(21) Appl. No.: 17/266,999

(22) PCT Filed: Nov. 23, 2020

(86) PCT No.: PCT/CN2020/130838
§ 371 (c)(1),
(2) Date: Feb. 8, 2021

(87) PCT Pub. No.: WO2022/016760
PCT Pub. Date: Jan. 27, 2022

(65) Prior Publication Data

US 2022/0358879 A1 Nov. 10, 2022

(30) Foreign Application Priority Data

Jul. 24, 2020 (CN) ......................... 202010724831.9

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2320/0233* (2013.01)

(58) Field of Classification Search
CPC ......... G09G 3/3233; G09G 2300/0842; G09G 2310/061; G09G 2320/0233;
(Continued)

(56) References Cited

U.S. PATENT DOCUMENTS

2008/0169754 A1 7/2008 Yang
2015/0294618 A1 10/2015 Park
(Continued)

FOREIGN PATENT DOCUMENTS

CN 1677469 A 10/2005
CN 101630481 A 1/2010
(Continued)

OTHER PUBLICATIONS

International Search Report in International application No. PCT/CN2020/130838, dated Mar. 30, 2021.
(Continued)

*Primary Examiner* — Jeff Piziali
(74) *Attorney, Agent, or Firm* — PV IP PC Chung; Wei Te Chung; Zhigang Ma

(57) ABSTRACT

A pixel circuit, a method of driving the same, and a display device are provided. An input end of an anode reset transistor is connected to an output end of a driving transistor, and an output end of the anode reset transistor is connected to an anode of an organic light emitting diode to collect a leakage current from the anode of the organic light emitting diode through the anode reset transistor to the output end of the driving transistor in an light emitting state. Part of the collected current at the output end of the driving transistor enters the anode of the organic light emitting diode.

19 Claims, 6 Drawing Sheets

(58) Field of Classification Search
CPC ... G09G 2300/0819; G09G 2300/0861; G09G 2320/0214; G09G 2320/0238
See application file for complete search history.

(56) References Cited

U.S. PATENT DOCUMENTS

| | | | | |
|---|---|---|---|---|
| 2016/0140900 | A1* | 5/2016 | Yang | G09G 3/3258 345/206 |
| 2016/0148566 | A1* | 5/2016 | Tseng | G09G 3/3275 345/212 |
| 2016/0189610 | A1* | 6/2016 | Xiao | G09G 3/3258 345/77 |
| 2016/0267843 | A1* | 9/2016 | Wang | G09G 3/3233 |
| 2016/0275854 | A1* | 9/2016 | Wang | G09G 3/3233 |
| 2017/0061868 | A1* | 3/2017 | Tseng | G09G 3/3233 |
| 2017/0116919 | A1* | 4/2017 | Ma | G02F 1/136213 |
| 2020/0294461 | A1* | 9/2020 | Xu | G09G 3/3677 |

FOREIGN PATENT DOCUMENTS

| | | | | |
|---|---|---|---|---|
| CN | 103208263 | A | 7/2013 | |
| CN | 104021762 | A | 9/2014 | |
| CN | 104464643 | A | 3/2015 | |
| CN | 104658470 | A | 5/2015 | |
| CN | 107452339 | A | 12/2017 | |
| CN | 107591124 | A | 1/2018 | |
| CN | 107610651 | A | 1/2018 | |
| CN | 208141796 | U | * 11/2018 | G09G 3/20 |
| CN | 111754938 | A | 10/2020 | |
| CN | 212276788 | U | 1/2021 | |
| JP | 2004185684 | A | 7/2004 | |

OTHER PUBLICATIONS

Written Opinion of the International Search Authority in International application No. PCT/CN2020/130838, dated Mar. 30, 2021.
Chinese Office Action issued in corresponding Chinese Patent Application No. 202010724831.9 dated Jul. 6, 2023, pp. 1-5.

* cited by examiner

PIXEL CIRCUIT, METHOD OF DRIVING SAME, AND DISPLAY DEVICE

RELATED APPLICATIONS

This application is a Notional Phase of PCT Patent Application No. PCT/CN2020/130838 having international filing date of Nov. 23, 2020, which claims the benefit of priority of Chinese Patent Application No. 202010724831.9 filed on Jul. 24, 2020. The contents of the above applications are all incorporated by reference as if fully set forth herein in their entirety.

FIELD

The present disclosure relates to display technologies, and more particularly, to a pixel circuit, a method of driving the same, and a display device.

BACKGROUND

Please refer to FIG. 1, which is an equivalent circuit diagram of a conventional pixel circuit of a single pixel. The pixel circuit of a single pixel includes a driving transistor T1, a switch transistor T2, a compensation transistor T3, an initializing transistor T4, a first light emission control transistor T5, a second light emission control transistor T6, an anode reset transistor T7, a storage capacitor C, and an organic light emitting diode OLED. A control end of the driving transistor T1 is connected to a first end of the storage capacitor C, a first end of the compensation transistor T3, and a first end of the initializing transistor T4. A first end of the driving transistor T1 is connected to a first power voltage end ELVDD through the first light emission control transistor T5. A second end of the driving transistor T1 is connected to an anode of the organic light emitting diode OLED through the second light emission control transistor T6. A first end of the switch transistor T2 is connected to a data signal end Data. A second end of the switch transistor T2 is connected to the first end of the driving transistor T1. A control end of the switch transistor T2 is connected to a nth scan signal end Scan(n), where n is an integer greater than or equal to 2. A control end of the compensation transistor T3 is connected to the nth scan signal end Scan(n). The first end of the compensation transistor T3 is connected to the control end of the driving transistor T1. A second end of the compensation transistor T3 is connected to the second end of the driving transistor T1. A control end of the initializing transistor T4 is connected to a (n−1)th scan signal end Scan(n−1). The first end of the initializing transistor T4 is connected to the control end of the driving transistor T1. A second end of the initializing transistor T4 is connected to a initializing signal end Vint. A control end of the first emission control transistor T5 and a control end of the second emission control transistor T6 are both connected to an emission control signal end EM. A control end of the anode reset transistor T7 is connected to the nth scan signal end Scan(n). A first end of the anode reset transistor T7 is connected to the anode of the organic light emitting diode OLED. A second end of the anode reset transistor T7 is connected to the initializing signal end Vint. A cathode of the organic light emitting diode OLED is connected to a second power voltage end ELVSS. Among them, the driving transistor T1, the switch transistor T2, the compensation transistor T3, the initializing transistor T4, the first light emission control transistor T5, the second light emission control transistor T6, and the anode reset transistor T7 are all P-type thin film transistors with a low temperature polysilicon active layer. A fatal weakness of low temperature polysilicon thin film transistors is larger leakage current. When the organic light emitting diode OLED emits light to display a low gray scale, current to the anode of the organic light emitting diode OLED is shunted by the turned off anode reset transistor T7, and an issue of brightness uneven at the low gray scale may occur.

In view of this, there is a need for a new solution to solve the issue in traditional technology of uneven brightness at the low gray scale when the displaying organic light emitting diode OLED is shunted by the turned off anode reset transistor T7.

SUMMARY

In view of the above, the present disclosure provides a pixel circuit, a method of driving the same, and a display device to resolve issues of uneven brightness by anode shunted when the organic light emitting diode displays a low gray scale.

In order to achieve above-mentioned object of the present disclosure, one embodiment of the disclosure provides a pixel circuit, including: an organic light emitting diode; a driving transistor, wherein an output end of the driving transistor is electrically connected to an anode of the organic light emitting diode; a compensating transistor, wherein a first end of the compensating transistor is connected to the output end of the driving transistor, and a second end of the compensating transistor is electrically connected to a control end of the driving transistor; an initializing transistor, wherein an input end of the initializing transistor is connected to a initializing signal, an output end of the initializing transistor is connected to the second end of the compensating transistor, and the output end of the initializing transistor is electrically connected to the control end of the driving transistor; and an anode reset transistor, wherein an input end of the anode reset transistor is connected to the output end of the driving transistor and the first end of the compensating transistor, and an output end of the anode reset transistor is connected to the anode of the organic light emitting diode.

In one embodiment of the disclosure, the pixel circuit further includes a leakage preventing transistor, wherein the leakage preventing transistor is connected between the second end of the compensating transistor and the control end of the driving transistor and connected between the output end of the initializing transistor and the control end of the driving transistor; and wherein at least one of the leakage preventing transistor, the initializing transistor, and the compensating transistor is a transistor with a metal oxide active layer.

In one embodiment of the pixel circuit, the leakage preventing transistor and the compensating transistor both are N type transistors with metal oxide active layers.

In one embodiment of the pixel circuit, a control end of the leakage preventing transistor and a control end of the compensating transistor both are connected to a first control signal line.

In one embodiment of the pixel circuit, the leakage preventing transistor is a N type transistor with a metal oxide active layer, and the compensating transistor is a P type transistor with a polysilicon active layer.

In one embodiment of the pixel circuit, the anode reset transistor is a N type transistor with a metal oxide active layer.

In one embodiment of the pixel circuit, the anode reset transistor and the initializing transistor both are P type transistors with polysilicon active layers, and a control end of the initializing transistor and a control end of the anode reset transistor both are connected to a second control signal line.

In one embodiment of the disclosure, the pixel circuit further includes:

a switch transistor, wherein an input end of the switch transistor is connected to a data signal line, and an output end of the switch transistor is connected to an input end of the driving transistor; a first light emitting control transistor, wherein an input end of the first light emitting control transistor is connected to a power signal line, and an output end of the first light emitting control transistor is connected to the input end of the driving transistor; a second light emitting control transistor, wherein an input end of the second light emitting control transistor is connected to the output end of the driving transistor, the first end of the compensating transistor, and the input end of the anode reset transistor, and an output end of the second light emitting control transistor is connected to the anode of the organic light emitting diode; and a capacitor, wherein a first end of the capacitor is connected to the power signal line, and a second end of the capacitor is connected to the control end of the driving transistor.

In one embodiment of the pixel circuit, all the driving transistor, the switch transistor, the first light emitting control transistor, and the second light emitting control transistor are P type transistors with polysilicon active layers.

Another embodiment of the disclosure further provides a method of driving the abovementioned pixel circuit, including steps of: in an anode reset phase, turning off the driving transistor, turning on the compensating transistor, turning on the initializing transistor to transmit a reset signal from a initializing signal line to the input end of the anode reset transistor through the compensating transistor, and transmitting the reset signal to the anode of the organic light emitting diode by the turned on anode reset transistor; and in a light emitting phase, turning off the anode reset transistor, turning off the compensating transistor, turning off the initializing transistor, and turning on the driving transistor to transmit a driving current to the anode of the organic light emitting diode.

Another embodiment of the disclosure further provides a display device, including a pixel circuit, wherein the pixel circuit includes: an organic light emitting diode; a driving transistor, wherein an output end of the driving transistor is electrically connected to an anode of the organic light emitting diode; a compensating transistor, wherein a first end of the compensating transistor is connected to the output end of the driving transistor, and a second end of the compensating transistor is electrically connected to a control end of the driving transistor; an initializing transistor, wherein an input end of the initializing transistor is connected to a initializing signal, an output end of the initializing transistor is connected to the second end of the compensating transistor, and the output end of the initializing transistor is electrically connected to the control end of the driving transistor; and an anode reset transistor, wherein an input end of the anode reset transistor is connected to the output end of the driving transistor and the first end of the compensating transistor, and an output end of the anode reset transistor is connected to the anode of the organic light emitting diode.

In one embodiment of the disclosure, the display device further includes a leakage preventing transistor, wherein the leakage preventing transistor is connected between the second end of the compensating transistor and the control end of the driving transistor and connected between the output end of the initializing transistor and the control end of the driving transistor; and wherein at least one of the leakage preventing transistor, the initializing transistor, and the compensating transistor is a transistor with a metal oxide active layer.

In one embodiment of the display device, the leakage preventing transistor and the compensating transistor both are N type transistors with metal oxide active layers.

In one embodiment of the display device, a control end of the leakage preventing transistor and a control end of the compensating transistor both are connected to a first control signal line.

In one embodiment of the display device, the leakage preventing transistor is a N type transistor with a metal oxide active layer, and the compensating transistor is a P type transistor with a polysilicon active layer.

In one embodiment of the display device, the anode reset transistor is a N type transistor with a metal oxide active layer.

In one embodiment of the display device, the anode reset transistor and the initializing transistor both are P type transistors with polysilicon active layers, and a control end of the initializing transistor and a control end of the anode reset transistor both are connected to a second control signal line.

In one embodiment of the disclosure, the display device further includes: a switch transistor, wherein an input end of the switch transistor is connected to a data signal line, and an output end of the switch transistor is connected to an input end of the driving transistor; a first light emitting control transistor, wherein an input end of the first light emitting control transistor is connected to a power signal line, and an output end of the first light emitting control transistor is connected to the input end of the driving transistor; a second light emitting control transistor, wherein an input end of the second light emitting control transistor is connected to the output end of the driving transistor, the first end of the compensating transistor, and the input end of the anode reset transistor, and an output end of the second light emitting control transistor is connected to the anode of the organic light emitting diode; and a capacitor, wherein a first end of the capacitor is connected to the power signal line, and a second end of the capacitor is connected to the control end of the driving transistor.

In one embodiment of the display device, all the driving transistor, the switch transistor, the first light emitting control transistor, and the second light emitting control transistor are P type transistors with polysilicon active layers.

In comparison with prior art, the disclosure provides the pixel circuit, the method of driving the same, and the display device. The pixel circuit includes an organic light emitting diode; a driving transistor, wherein an output end of the driving transistor is electrically connected to an anode of the organic light emitting diode; a compensating transistor, wherein a first end of the compensating transistor is connected to the output end of the driving transistor, and a second end of the compensating transistor is electrically connected to a control end of the driving transistor; an initializing transistor, wherein an input end of the initializing transistor is connected to a initializing signal, an output end of the initializing transistor is connected to the second end of the compensating transistor, and the output end of the initializing transistor is electrically connected to the control end of the driving transistor; and an anode reset transistor, wherein an input end of the anode reset transistor is connected to the output end of the driving transistor and the first end of the compensating transistor, and an output end of the anode reset transistor is connected to the anode of the organic light emitting diode. By the connection between the input end of the anode reset transistor and the output end of the driving transistor and between the output end of the anode reset transistor and the anode of the organic light emitting diode, a leakage current from the anode of the organic light emitting diode through the anode reset transistor when the organic light emitting diode is in a light emitting state is collected to the output end of the driving transistor. Part of the current collected to the output end of the driving transistor transmits to the anode of the organic light emitting diode to improve the issue of uneven brightness by anode shunted when the organic light emitting diode displays the low gray scale. Furthermore, the compensating transistor and the initializing transistor are connected between the anode reset transistor and the initializing signal line to let the reset signal inputted by the initializing signal line pass through the compensating transistor and the initializing transistor to the anode reset transistor, then pass through the anode reset transistor to the anode of the organic light emitting diode. The disclosure provides a novel anode reset path comparing with prior art.

DETAILED DESCRIPTION

Figure 1:
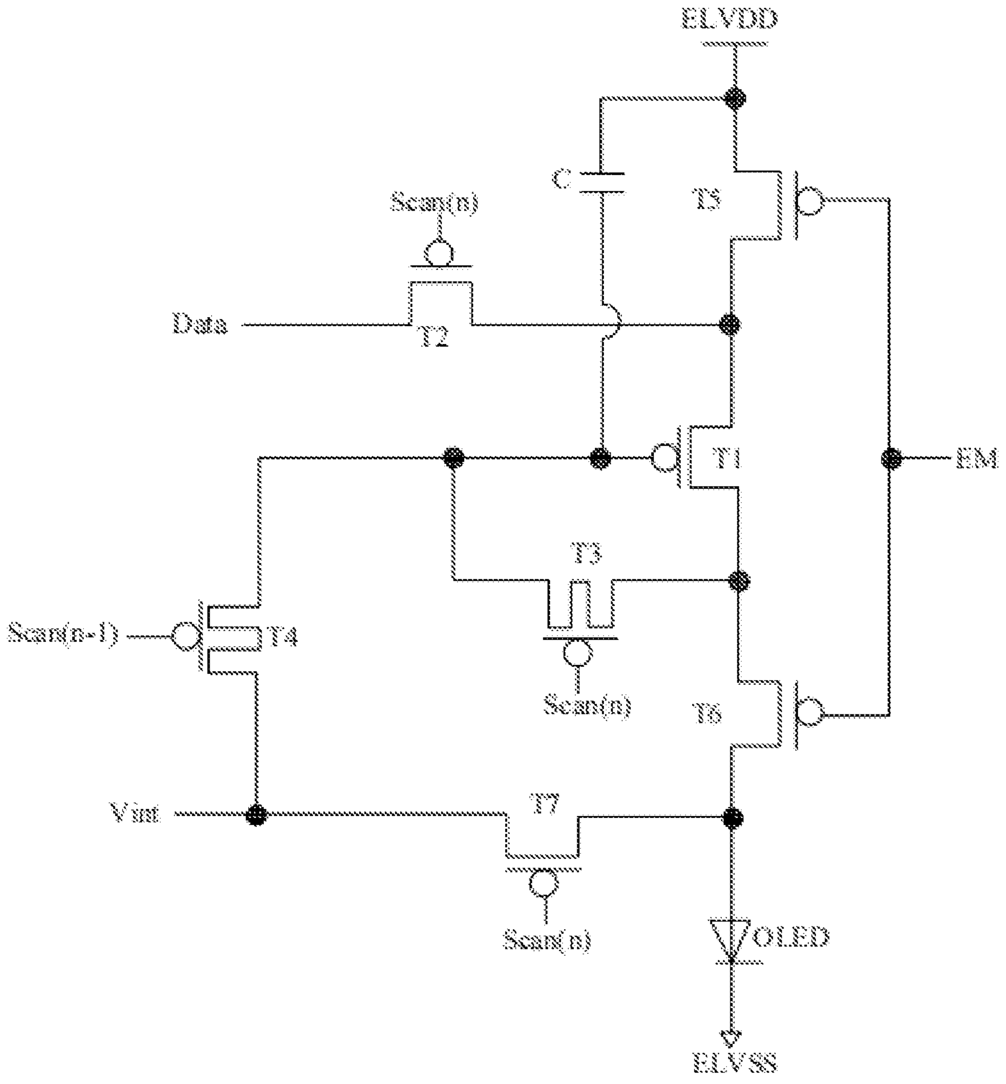
FIG. 1 (Prior Art)
FIG. 1 is a schematic view of an equivalent circuit of a traditional pixel circuit of a single pixel.

The technical solutions in the embodiments of the present application will be described clearly and completely in conjunction with the drawings in the embodiments of the present application. Obviously, the described embodiments are only a part of the embodiments of the present application, but not all the embodiments. Based on the embodiments in the present application, all other embodiments obtained by those skilled in the art without making creative work fall within the protection scope of the present application.

One embodiment of the disclosure provides a display device, including a display panel and a source driver. the display panel is an organic light emitting diode display panel. The display panel includes a display region and a non-display region disposed around the display region. The display panel includes a lot of pixel circuits arranged in an array in the display region. The display panel further includes scan signal lines, data signal lines, initializing signal lines, power voltage signal lines, and light emitting control signal lines in the display region. The source driver is electrically connected to the data signal lines and transmits data signals to the data signal lines. The display panel includes a gate on array (GOA) circuit in the non-display region, the GOA circuit is configured to provide gate control signals including scan signal transmitted to the scan signal lines and light emitting control signal transmitted to the light emitting control lines.

The pixel circuit includes an organic light emitting diode, a switch transistor, a driving transistor, a compensating transistor, an initializing transistor, an anode reset transistor, a first light emitting control transistor, and a second light emitting control transistor.

The organic light emitting diode includes a cathode, an anode, and an organic light emitting layer disposed between the cathode and the anode. The organic light emitting diode is configured to emitting light to display different gray scales under different driving currents. The current passing through the organic light emitting diode is small when displaying a low gray scale. If the current shunts at the anode of the organic light emitting diode before entering to the organic light emitting diode, a display effect of the low gray scale of the organic light emitting diode will be seriously affected.

A control end of the driving transistor is connected to a second end of a capacitor, an output end of the initializing transistor, and a second end of the compensating transistor. An input end of the driving transistor is connected to the power signal line through the first light emitting control transistor. An output end of the driving transistor is connected to an anode of the organic light emitting diode through the second light emitting control transistor. The driving transistor is configured to provide a driving current to the organic light emitting diode.

A control end of the switch transistor is connected to a third control signal line. An input end of the switch transistor is connected to a data signal line. An output end of the switch transistor is connected to the input end of the driving transistor. The third control signal line is a third scan signal line. The third control signal line is configured to transmit a third control signal from the GOA circuit. The switch transistor is configured to transmit the data signal from the data signal line to the input end of the driving transistor according to the third control signal.

A first end of the compensating transistor is connected to the output end of the driving transistor. A second end of the compensating transistor is electrically connected to the control end of the driving transistor. The compensating transistor is configured to electrically connected the output end of the driving transistor with the control end of the driving transistor.

An input end of the initializing transistor is connected to an initializing signal line. An output end of the initializing transistor is connected to the second end of the compensating transistor. The output end of the initializing transistor is also electrically connected to the control end of the driving transistor. The initializing signal line is configured to transmit an initializing signal or a reset signal. The initializing transistor is configured to transmit the initializing signal from the initializing signal line to the control end of the driving transistor to initialize the control end of the driving transistor. The initializing transistor is further configured to transmit the initializing signal or the reset signal to the anode reset transistor through the turned-on compensating transistor. The turned-on anode reset transistor is configured to transmit the initializing signal of the reset signal to the anode of the organic light emitting diode to initialize the anode of the organic light emitting diode.

An input end of the anode reset transistor is connected to the output end of the driving transistor and the first end of the compensating transistor. An output end of the anode reset transistor is connected to the anode of the organic light emitting diode. The input end of the anode reset transistor is connected to the output end of the driving transistor to collect a leakage current of the anode of the organic light emitting diode through the anode reset transistor to the output end of the driving transistor. At least part of the collected leakage current at the output end of the driving transistor still enters the organic light emitting diode. The input end of the anode reset transistor is connected to the first end of the compensating transistor to make the input end of the anode reset transistor receive the initializing signal or the reset signal through the turned-on compensating transistor to reset the anode of the organic light emitting diode.

The pixel circuit further includes a leakage preventing transistor. The leakage preventing transistor is connected between the second end of the compensating transistor and the control end of the driving transistor and connected between the output end of the initializing transistor and the control end of the driving transistor. At least one of the leakage preventing transistor, the initializing transistor, and the compensating transistor is a transistor with a metal oxide active layer to reduce the leakage current at the control end of the driving transistor and to prevent the control end of the driving transistor from serious leakage to affect a low frequency display or ultra-low frequency display when the driving transistor drives the organic light emitting diode to display.

When the leakage preventing transistor and the compensating transistor both are N type transistors with metal oxide active layers, the leakage preventing transistor and the compensating transistor both are leakage less. On one hand, the less leakage of the leakage preventing transistor suppresses an electrical potential at the control end of the driving transistor from fluctuating in a period of one frame. The less leakage of the compensating transistor prevents the control end of the driving transistor from leakage through the compensating transistor. On the other hand, the less leakage of the compensating transistor prevents the leakage current collected at the driving transistor through the anode reset transistor from leaking off the compensating transistor but entering the organic light emitting diode through the second light emitting control transistor to improve the issue of uneven brightness when the organic light emitting diode displays the low gray scale.

A control end of the leakage preventing transistor and a control end of the compensating transistor both are connected to a first control signal line to be controlled turned on or off with a same control signal. The first control signal line is configured to transmit a first control signal from the GOA circuit. The first control signal line is a first scan signal line.

When the leakage preventing transistor is a N type transistor with a metal oxide active layer, and the compensating transistor is a P type transistor with a polysilicon active layer, the leakage preventing transistor is configured to suppress an electrical potential at the control end of the driving transistor from fluctuating. A manufacturing of a P type polysilicon transistor is easier than a manufacturing of a N type metal oxide transistor. When the compensating transistor is the P type transistor with a polysilicon active layer, a process risk is easily to reduce, and a yield of product is enhanced.

When the anode reset transistor is a N type transistor with a metal oxide active layer, the anode reset transistor possesses a leakage less character to prevent the anode of the organic light emitting diode from leaking current through the turned-off anode reset transistor and improves the issue of uneven brightness when the organic light emitting diode displays the low gray scale.

When the anode reset transistor and the initializing transistor both are P type transistors with polysilicon active layers, a control end of the initializing transistor and a control end of the anode reset transistor both are connected to a second control signal line to be controlled turned on or off with a same control signal. The second control signal line is configured to transmit a second control signal from the GOA circuit. The second control signal line is a second scan signal line.

An input end of the first light emitting control transistor is connected to a power signal line. An output end of the first light emitting control transistor is connected to the input end of the driving transistor. A control end of the first light emitting control transistor is connected to a light emitting control signal line. The first light emitting control transistor is configured to transmit the power signal from the power signal line to the input end of the driving transistor according to the light emitting control signal from the light emitting control signal line.

An input end of the second light emitting control transistor is connected to the output end of the driving transistor, the first end of the compensating transistor, and the input end of the anode reset transistor. An output end of the second light emitting control transistor is connected to the anode of the organic light emitting diode. A control end of the second light emitting control transistor is connected to the light emitting control signal line. The second light emitting control transistor is configured to transmit a driving current from the driving transistor to the anode of the organic light emitting diode according to the light emitting control signal from the light emitting control signal line.

A first end of the capacitor is connected to the power signal line. A second end of the capacitor is connected to the control end of the driving transistor. The capacitor is configured to keep an electrical level of at the control end of the driving transistor during the driving transistor driving the organic light emitting diode to emit light.

When all the driving transistor, the switch transistor, the first light emitting control transistor, and the second light emitting control transistor are P type transistors with polysilicon active layers, the P type transistor is turned on under a low level and turned off under a high level. In detail, transistors with polysilicon active layers in the disclosure all are low temperature polysilicon transistors. When the pixel circuit includes polysilicon transistors and metal oxide transistors, a working power consumption of the pixel circuit will be easily to reduce.

The above solution will be described in detail below in conjunction with embodiments.

Figure 2A:
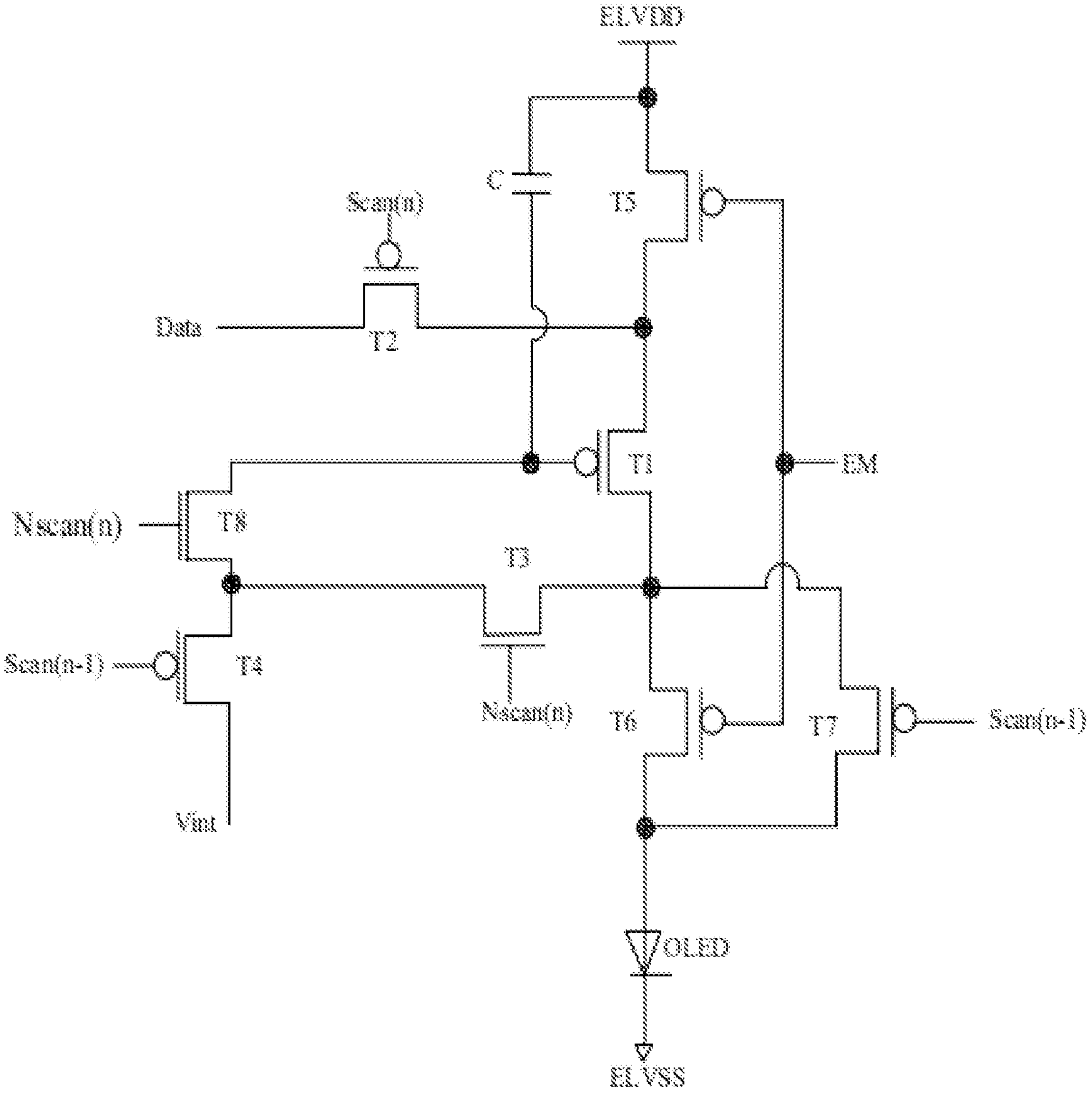
FIG. 2A is a schematic view of an equivalent circuit of a pixel circuit of a single pixel according to a first embodiment of the present disclosure.

Referring to FIG. 2A, FIG. 2A is a schematic view of an equivalent circuit of a pixel circuit of a single pixel according to a first embodiment of the present disclosure. The pixel circuit includes an organic light emitting diode OLED, a driving transistor T1, a switch transistor T2, a compensating transistor T3, an initializing transistor T4, a first light emitting control transistor T5, a second light emitting control transistor T6, an anode reset transistor T7, a leakage preventing transistor T8, and a capacitor C.

The organic light emitting diode OLED includes a cathode, an anode, and an organic light emitting layer disposed between the cathode and the anode. The cathode of the organic light emitting diode OLED is connected to the first power signal line ELVSS. The anode of the organic light emitting diode OLED is connected to the output end of the anode reset transistor T7 and the output end of the second light emitting control transistor T6.

A control end of the driving transistor T1 is connected to an output end of the leakage preventing transistor T8 and a second end of a capacitor C. An input end of the driving transistor T1 is connected to an output end of the first light emitting control transistor T5 and an output end of the switch transistor T2. An output end of the driving transistor T1 is connected to an input end of the second light emitting control transistor T6, a first end of the compensating transistor T3, and an input end of the of the anode reset transistor T7. The driving transistor T1 is configured to provide a driving current to the organic light emitting diode OLED.

A control end of the switch transistor T2 is connected to a third control signal line Scan(n). An input end of the switch transistor is connected to a data signal line Data. An output end of the switch transistor is connected to the input end of the driving transistor T1. The third control signal line is a third scan signal line. The third control signal line is configured to transmit a third control signal from the GOA circuit. The switch transistor T2 is configured to transmit the data signal from the data signal line Data to the input end of the driving transistor T1 according to the third control signal from the third control signal line Scan(n).

A control end of the compensating transistor T3 is connected to a first control signal line Nscan(n). A first end of the compensating transistor T3 is connected to the output end of the driving transistor T1. A second end of the compensating transistor T3 is electrically connected to the control end of the driving transistor T1. The compensating transistor T3 is configured to electrically connected the output end of the driving transistor T1 with the control end of the driving transistor T1 through the turned-on leakage preventing transistor T8 according to a first control signal from the first control signal line Nscan(n).

A control end of the initializing transistor T4 is connected to a second control signal line Scan(n−1). An input end of the initializing transistor T4 is connected to an initializing signal line Vint. An output end of the initializing transistor T4 is connected to the second end of the compensating transistor T3. The output end of the initializing transistor T4 is also electrically connected to the control end of the driving transistor T1. The initializing transistor T4 is configured to transmit the initializing signal from the initializing signal line Vint to the control end of the driving transistor T1 through the turned-on leakage preventing transistor T8 according to a second control signal from the second control signal line Scan(n−1) and configured to transmit the initializing signal to the anode of the organic light emitting diode through the turned-on compensating transistor T3 and the turned-on anode reset transistor T7 in sequence to initialize the control end of the driving transistor T1 and the anode of the organic light emitting diode OLED at a same time. Comparing to a traditional technology that resets the anode of the organic light emitting diode OLED only by the anode reset transistor T7, the embodiment of the disclosure resets the anode of the organic light emitting diode OLED through the turned-on initializing transistor T4, the turned-on compensating transistor T3, and the turned-on anode reset transistor T7.

A control end of the first light emitting control transistor T5 is connected to a light emitting control signal line EM. An input end of the first light emitting control transistor T5 is connected to a second power signal line ELVDD. An output end of the first light emitting control transistor T5 is connected to the input end of the driving transistor T1. The first light emitting control transistor T5 is configured to transmit a second power signal from the second power signal line ELVDD to the input end of the driving transistor T1 according to the light emitting control signal from the light emitting control signal line EM.

A control end of the second light emitting control transistor T6 is connected to the light emitting control signal line EM. An input end of the second light emitting control transistor T6 is connected to the output end of the driving transistor T1, the first end of the compensating transistor T3, and the input end of the anode reset transistor T7. An output end of the second light emitting control transistor T6 is connected to the anode of the organic light emitting diode OLED. The second light emitting control transistor T6 is configured to transmit a driving current from the driving transistor T1 to the anode of the organic light emitting diode OLED according to the light emitting control signal from the light emitting control signal line.

A control end of the anode reset transistor T7 is connected to the second control signal line Scan(n−1). An input end of the anode reset transistor T7 is connected to the output end of the driving transistor T1, the first end of the compensating transistor T3, and the input end of the second light emitting control transistor T6. An output end of the anode reset transistor T7 is connected to the anode of the organic light emitting diode OLED. The anode reset transistor T7 is configured to transmit a initializing signal passing through the turned-on initializing transistor T4 and the turned-on compensating transistor T3 to the anode of the organic light emitting diode OLED according to the second control signal from the second control signal line Scan(n−1). When the organic light emitting diode OLED is turned off, a leakage current of the anode of the organic light emitting diode OLED through the anode reset transistor T7 is collected to the output end of the driving transistor T1. Part of the collected leakage current at the output end of the driving transistor T1 still enters the anode of the organic light emitting diode OLED through the turned-on second light emitting control transistor T6 to improve the issue of uneven brightness by anode shunted when the organic light emitting diode OLED displays the low gray scale.

A control end of the leakage preventing transistor T8 is connected to the first control signal line Nscan(n). The leakage preventing transistor T8 is connected between the second end of the compensating transistor T3 and the control end of the driving transistor T1 and connected between the output end of the initializing transistor T4 and the control end of the driving transistor T1. The leakage preventing transistor T8 is a transistor with a metal oxide active layer.

A first end of the capacitor C is connected to the second power signal line ELVDD. A second end of the capacitor C is connected to the control end of the driving transistor T1. The capacitor C is configured to keep an electrical level of at the control end of the driving transistor T1 during the organic light emitting diode emitting light in one frame.

Figure 2B:
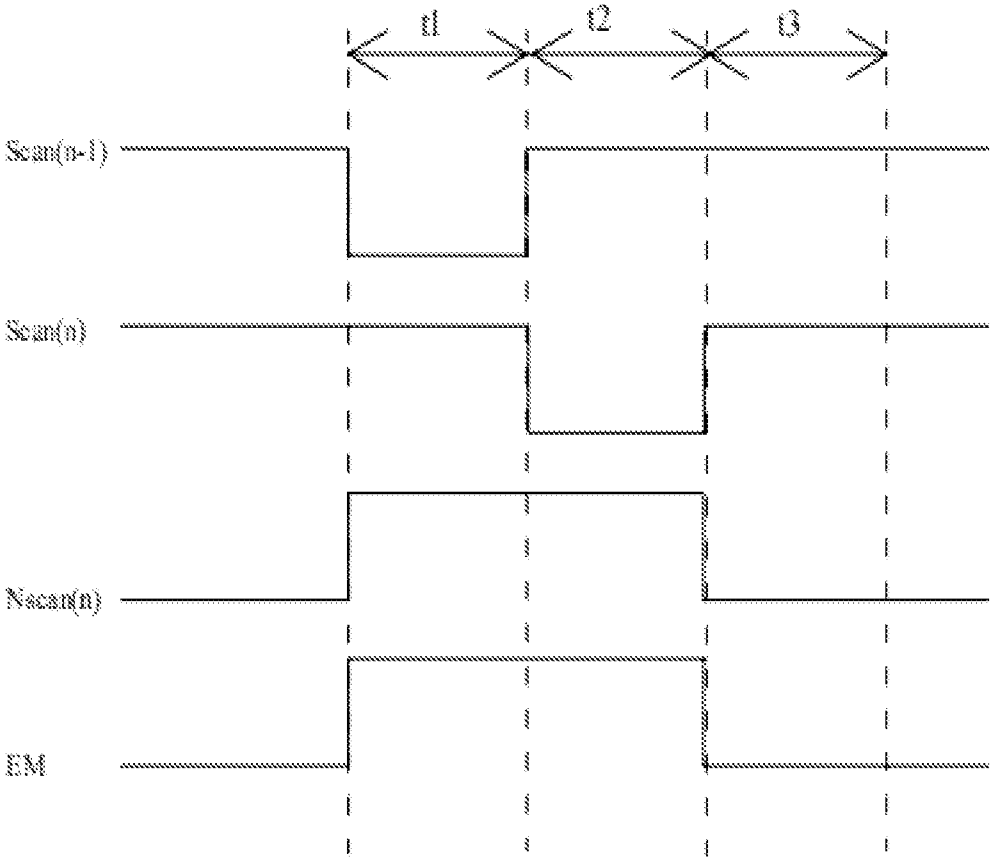
FIG. 2B is a schematic view of a driving time sequence of an equivalent circuit of a pixel circuit of a single pixel according to FIG. 2A.

In the embodiment of the disclosure, the driving transistor T1, the switch transistor T2, the initializing transistor T4, the first light emitting control transistor T5, the second light emitting control transistor T6, and the anode reset transistor T7 all are P type transistors with polysilicon active layers. The compensating transistor T3 and the leakage preventing transistor T8 are both N type transistors with metal oxide active layers. The transistors with metal oxide active layers possess a leakage less character when turned off. When the driving transistor T1 drives the organic light emitting diode OLED to emit light, the leakage preventing transistor T8 is turned off to suppress an electrical potential at the control end of the driving transistor T1 from fluctuating and then to prevent from a large leakage current at the control end do the driving transistor T1 which causes issues at low frequency display of the organic light emitting diode. When the driving transistor T1 drives the organic light emitting diode OLED to emit light, the compensating transistor T3 is turned off. The compensating transistor T3 possess a leakage less character when turned off to suppress the leakage current collected at output end of the driving transistor T1 through the anode reset transistor T7 from leaking through the compensating transistor T3 to improve the issue of uneven brightness by the anode shunted when the organic light emitting diode OLED displays the low gray scale. Referring to FIG. 2B, FIG. 2B is a schematic view of a driving time sequence of an equivalent circuit of a pixel circuit according to FIG. 2A.

A method of driving the abovementioned pixel circuit, including steps of: in an initializing phase t1, the first control signal line Nscan(n) transmits a high level first control signal, the second control signal line Scan(n−1) transmits a low level second control signal, the third control signal line Scan(n) transmits a high level third control signal, and the light emitting control signal line EM transmits a high level light emitting control signal. The driving transistor T1, the switch transistor T2, the first light emitting control transistor T5, and the second light emitting control transistor T6 are all turned off. The leakage preventing transistor T8 and the compensating transistor T3 are turned on. The initializing transistor T4 is turned on and transmits the initializing signal from the initializing signal line Vint to the control end of the driving transistor T1 through the turned-on leakage preventing T8 to initialize the control end of the driving transistor T1. The initializing transistor T4 transmits the initializing signal to the input end of the anode reset transistor T7 through the turned-on compensating transistor T3. The anode reset transistor T7 is turned on to transmit the initializing signal to the anode of the organic light emitting diode OLED to reset the organic light emitting diode.

In a threshold voltage compensating and data voltage writing phase t2, the first control signal line Nscan(n) transmits a high level first control signal, the second control signal line Scan(n−1) transmits a high level second control signal, the third control signal line Scan(n) transmits a low level third control signal, and the light emitting control signal line EM is transmits a high level light emitting control signal. All the initializing transistor T4, the anode reset transistor T7, the first light emitting control transistor T5, and the second light emitting control transistor T6 are turned off. The compensating transistor T3 and the leakage preventing transistor T8 are turned on to electrically connected the control end of the driving transistor T1 and the output end of the driving transistor T1. The switch transistor T2 is turned on to transmit a data signal from the data signal line Data to the input end of the driving transistor T1.

In a light emitting phase t3, the first control signal line Nscan(n) transmits a low level first control signal, the second control signal line Scan(n−1) transmits a high level second control signal, the third control signal line Scan(n) transmits a high level third control signal, and the light emitting control signal line EM is transmits a low level light emitting control signal. All the compensating transistor T3, the leakage preventing transistor T8, the initializing transistor T4, the anode reset transistor T7, and the switch transistor T2 are turned off. The first light emitting control transistor T5 is turned on to transmit the second power signal to the input end of the driving transistor T1. The driving transistor T1 is turned on and outputs a driving current. The second light emitting control transistor T6 is turned on to transmit the driving current to the anode of the organic light emitting diode OLED. The organic light emitting diode OLED emits light.

Figure 3A:
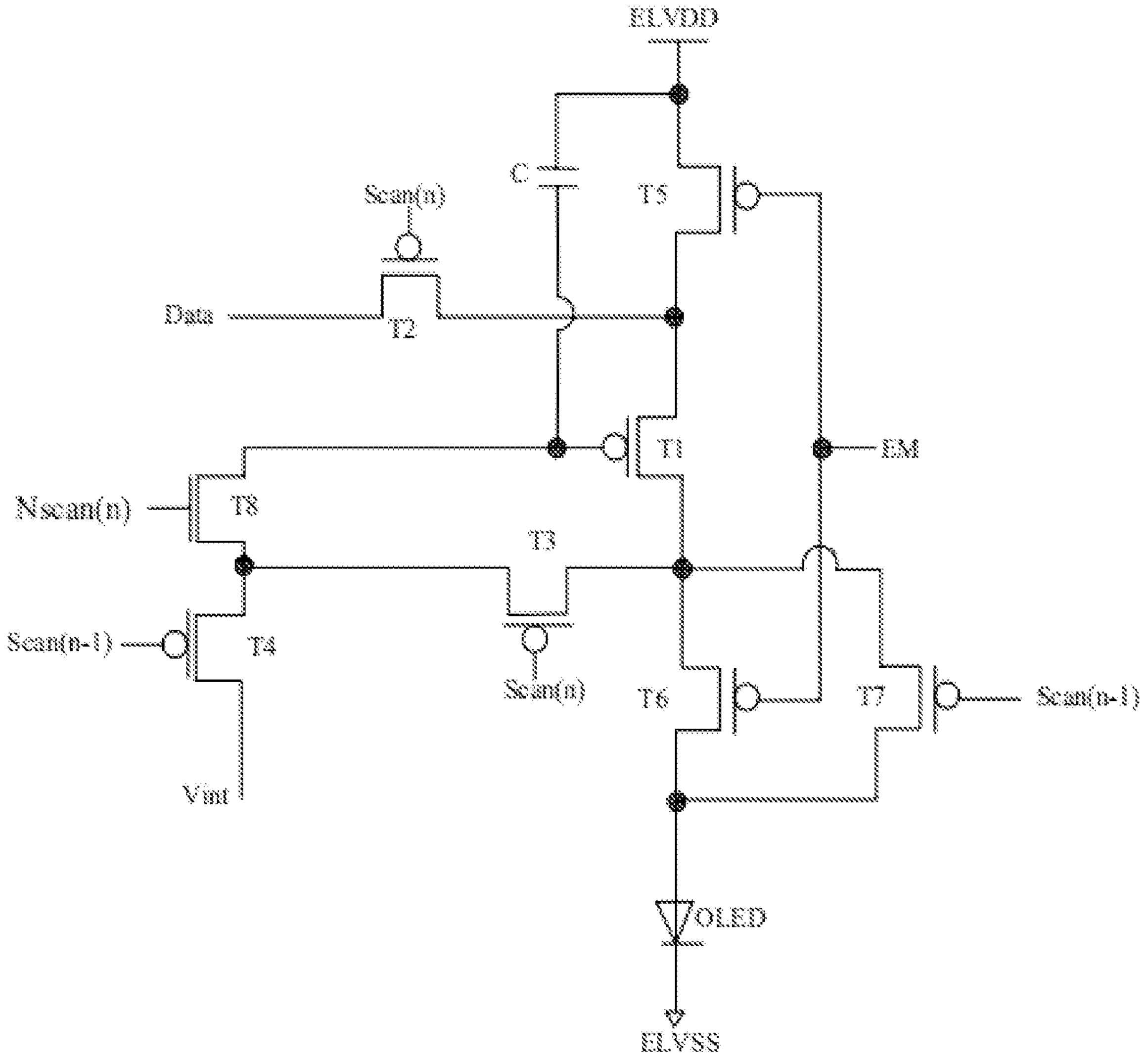
FIG. 3A is a schematic view of an equivalent circuit of a pixel circuit of a single pixel according to a second embodiment of the present disclosure.

Referring to FIG. 3A, FIG. 3A is a schematic view of an equivalent circuit of a pixel circuit of a single pixel according to a second embodiment of the present disclosure. The equivalent circuit in FIG. 3 is similar to the equivalent circuit in FIG. 2. The difference between them lays on the compensating transistor T3 in FIG. 3A is a P type transistor with a polysilicon active layer. Comparing to the pixel circuit in FIG. 2A, only the leakage preventing transistor T8 is N type transistors with metal oxide active layer in FIG. 3. The driving transistor T1, the switch transistor T2, the compensating transistor T3, the initializing transistor T4, the first light emitting control transistor T5, the second light emitting control T6, and the anode reset transistor T7 are all P type transistors with low temperature polysilicon active layers. A manufacturing process of the P type low temperature polysilicon transistor is easier than a manufacturing process of the N type metal oxide transistor. It is beneficial to reduce the difficulty of a manufacturing process of the pixel circuit and improve a product yield. The control end of the compensating transistor T3 is connected to the third control signal line Scan(n) to electrically connect the control end of the driving transistor T1 and the output end of the driving transistor T1 through the turned-on leakage preventing transistor T8 according to the third control signal from the third control signal line.

Figure 3B:
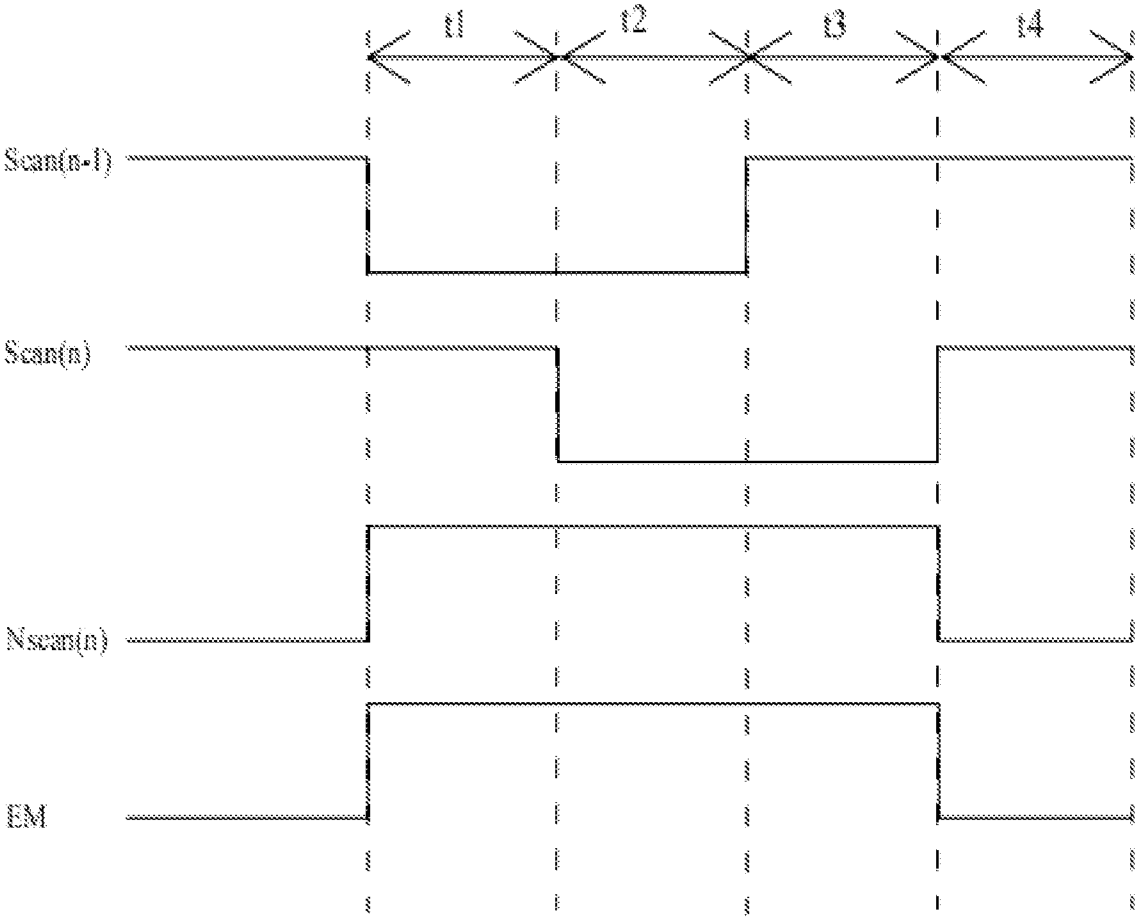
FIG. 3B is a schematic view of a driving time sequence of an equivalent circuit of a pixel circuit of a single pixel according to FIG. 3A.

Referring to FIG. 3B, FIG. 3B is schematic view of a driving time sequence of an equivalent circuit of a pixel circuit according to FIG. 3A.

In an initializing phase t1, the third control signal line Scan(n) transmits a high level third control signal. The compensating transistor T3 is turned off. The switch transistor T2 is turned off. The second control signal line Scan(n−1) transmits a low level second control signal. The initializing transistor T4 is turned on. The anode reset transistor T7 is turned on. The first control signal line Nscan(n) transmits a high level first control signal. The leakage preventing transistor T8 is turned on. The light emitting control signal line EM transmits a high level light emitting control signal. The first light emitting control transistor T5, and the second light emitting control transistor T6 are all turned off. The initializing transistor T4 is turned on and transmits the initializing signal from the initializing signal line Vint to the control end of the driving transistor T1 through the turned-on leakage preventing T8 to initialize the control end of the driving transistor T1.

In an anode reset phase t2, the third control signal line Scan(n) transmits a low level third control signal. The compensating transistor T3 is turned on. The second control signal line Scan(n−1) transmits a low level second control signal. The initializing transistor T4 and the anode reset transistor T7 are turned on. The light emitting control signal line EM transmits a high level light emitting control signal. The first light emitting control transistor T5 and the second light emitting control transistor T6 are turned off. The turned-on initializing transistor T4 transmits a reset signal from a initializing signal line Vint to the anode of the organic light emitting diode through the turned-on compensating transistor T3 and the turned-on anode reset transistor T7 to reset the anode of the organic light emitting diode OLED.

In a threshold voltage compensating and data writing phase t3, the third control signal line Scan(n) transmits a low level third control signal. The compensating transistor T3 is turned on. The switch transistor T2 is turned on. The second control signal line Scan(n−1) transmits a high level second control signal. The initializing transistor T4 and the anode reset transistor T7 are turned off. The first control signal line Nscan(n) transmits a high level first control signal. The leakage preventing transistor T8 is turned on. The light emitting control signal line EM is transmits a high level light emitting control signal. The first light emitting control transistor T5 and the second light emitting control transistor T6 are turned off. The compensating transistor T3 and the leakage preventing transistor T8 are turned on to electrically connected the control end of the driving transistor T1 and the output end of the driving transistor T1. The switch transistor T2 is turned on to transmit a data signal from the data signal line Data to the input end of the driving transistor T1.

In a light emitting phase t4, the third control signal line Scan(n) transmits a high level third control signal. The compensating transistor T3 and the switch transistor T2 are turned off. The second control signal line Scan(n−1) transmits a high level second control signal. The initializing transistor T4 and the anode reset transistor T7 are turned off. The first control signal line Nscan(n) transmits a low level first control signal. The leakage preventing transistor T8 is turned off. The light emitting control signal line EM is transmits a low level light emitting control signal. The first light emitting control transistor T5 is turned on to transmit the second power signal to the input end of the driving transistor T1. The driving transistor T1 is turned on and outputs a driving current. The second light emitting control transistor T6 is turned on to transmit the driving current to the anode of the organic light emitting diode OLED. The organic light emitting diode OLED emits light.

In the embodiment, when the organic light emitting diode OLED emits light, a leakage current through the anode reset transistor T7 is collected to the output end of the driving transistor T1. At least part of the collected leakage current at the output end of the driving transistor T1 still enters the anode of the organic light emitting diode OLED to prevent from the issue of uneven brightness by anode shunted when the organic light emitting diode OLED displays the low gray scale.

Figure 4:
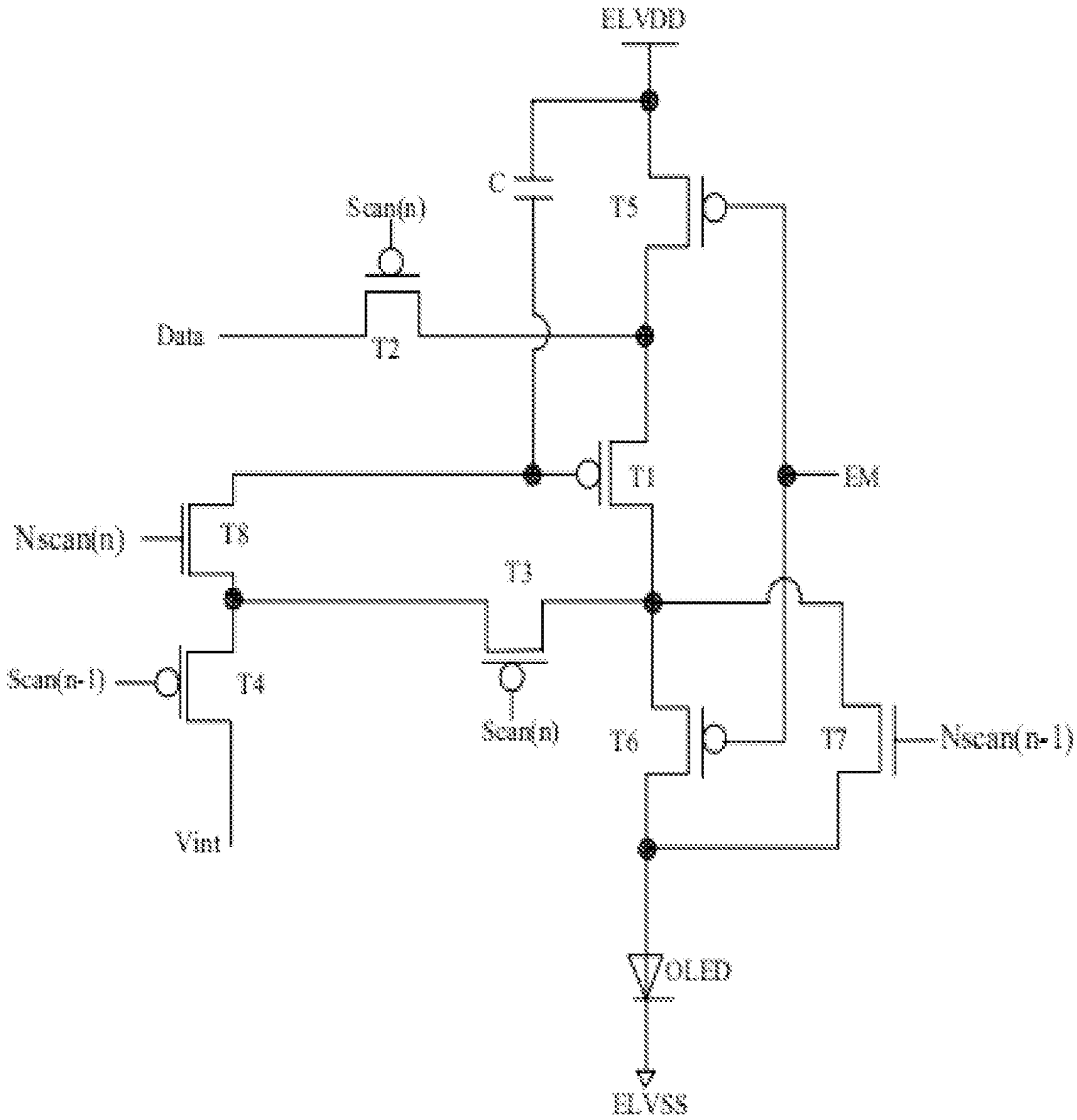
FIG. 4 is a schematic view of an equivalent circuit of a pixel circuit of a single pixel according to a third embodiment of the present disclosure.

Referring to FIG. 4, FIG. 4 is a schematic view of an equivalent circuit of a pixel circuit of a single pixel according to a third embodiment of the present disclosure. The equivalent circuit of the pixel circuit in FIG. 4 is similar to the equivalent circuit of the pixel circuit in FIG. 3A. The difference between them lays on the anode reset transistor T7 in FIG. 4 is a N type transistor with a metal oxide active layer. The control end of the anode reset transistor T7 is connected to a fourth control signal line Nscan(n−1). The fourth control signal line Nscan(n−1) transmits a fourth control signal. The fourth control signal is different from the first control signal, the second control signal, the third control signal, and the light emitting control signal. Because the anode reset transistor T7 is a N type transistor with a metal oxide active layer, the anode reset transistor T7 possesses a leakage less character when turned off. The anode of the organic light emitting diode OLED is prevented from shunted current through the turned-off anode reset transistor T7. The issue of uneven brightness when the organic light emitting diode displays the low gray scale is improved.

The equivalent circuit of the pixel circuit in FIG. 4 has a driving time sequence similar to the driving time sequence in FIG. 3B. The difference between them lays on the following: the fourth control signal line Nscan(n−1) transmits a low level fourth control signal and the anode reset transistor T7 is turned off in the initializing phase t1; the fourth control signal line Nscan(n−1) transmits a high level fourth control signal and the anode reset transistor T7 is turned on in the anode reset phase t2; and the fourth control signal line Nscan(n−1) transmits a low level fourth control signal and the anode reset transistor T7 is turned off in the threshold voltage compensating and data signal writing phase t3 and light emitting phase t4.

The present disclosure of an array substrate, a method of manufacturing the same, a display panel, and a spliced display have been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A pixel circuit, comprising:

an organic light emitting diode;

a driving transistor, wherein an output end of the driving transistor is electrically connected to an anode of the organic light emitting diode;

a compensating transistor, wherein a first end of the compensating transistor is connected to the output end of the driving transistor, and a second end of the compensating transistor is electrically connected to a control end of the driving transistor;

an initializing transistor, wherein an input end of the initializing transistor is connected to a initializing signal, an output end of the initializing transistor is connected to the second end of the compensating transistor, and the output end of the initializing transistor is electrically connected to the control end of the driving transistor; and an anode reset transistor, wherein an input end of the anode reset transistor is connected to the output end of the driving transistor and the first end of the compensating transistor, and an output end of the anode reset transistor is connected to the anode of the organic light emitting diode, wherein the compensating transistor and the initializing transistor are connected between the anode reset transistor and an initializing signal line.

2. The pixel circuit according to claim 1, further comprising a leakage preventing transistor, wherein a first end of the leakage preventing transistor is directly connected to the control end of the driving transistor, and a second end of the leakage preventing transistor is directly connected to the output end of the initializing transistor and the second end of the compensating transistor; and wherein at least one of the leakage preventing transistor, the initializing transistor, and the compensating transistor is a transistor with a metal oxide active layer.

3. The pixel circuit according to claim 2, wherein the leakage preventing transistor and the compensating transistor both are N type transistors with metal oxide active layers.

4. The pixel circuit according to claim 3, wherein a control end of the leakage preventing transistor and a control end of the compensating transistor both are connected to a first control signal line.

5. The pixel circuit according to claim 2, wherein the leakage preventing transistor is a N type transistor with a metal oxide active layer, and the compensating transistor is a P type transistor with a polysilicon active layer.

6. The pixel circuit according to claim 1, wherein the anode reset transistor is a N type transistor with a metal oxide active layer.

7. The pixel circuit according to claim 1, wherein the anode reset transistor and the initializing transistor both are P type transistors with polysilicon active layers, and a control end of the initializing transistor and a control end of the anode reset transistor both are connected to a second control signal line.

8. The pixel circuit according to claim 1, further comprising:

a switch transistor, wherein an input end of the switch transistor is connected to a data signal line, and an output end of the switch transistor is connected to an input end of the driving transistor;

a first light emitting control transistor, wherein an input end of the first light emitting control transistor is connected to a power signal line, and an output end of the first light emitting control transistor is connected to the input end of the driving transistor;

a second light emitting control transistor, wherein an input end of the second light emitting control transistor is connected to the output end of the driving transistor, the first end of the compensating transistor, and the input end of the anode reset transistor, and an output end of the second light emitting control transistor is connected to the anode of the organic light emitting diode; and a capacitor, wherein a first end of the capacitor is connected to the power signal line, and a second end of the capacitor is connected to the control end of the driving transistor.

9. The pixel circuit according to claim 8, wherein all the driving transistor, the switch transistor, the first light emitting control transistor, and the second light emitting control transistor are P type transistors with polysilicon active layers.

10. A method of driving the pixel circuit according to claim 1, comprising steps of:

in an anode reset phase, turning off the driving transistor, turning on the compensating transistor, turning on the initializing transistor to transmit a reset signal from a initializing signal line to the input end of the anode reset transistor through the compensating transistor, and transmitting the reset signal to the anode of the organic light emitting diode by the turned on anode reset transistor; and in a light emitting phase, turning off the anode reset transistor, turning off the compensating transistor, turning off the initializing transistor, and turning on the driving transistor to transmit a driving current to the anode of the organic light emitting diode.

11. A display device, comprising a pixel circuit, wherein the pixel circuit comprises:

an organic light emitting diode;

a driving transistor, wherein an output end of the driving transistor is electrically connected to an anode of the organic light emitting diode;

a compensating transistor, wherein a first end of the compensating transistor is connected to the output end of the driving transistor, and a second end of the compensating transistor is electrically connected to a control end of the driving transistor;

an initializing transistor, wherein an input end of the initializing transistor is connected to a initializing signal, an output end of the initializing transistor is connected to the second end of the compensating transistor, and the output end of the initializing transistor is electrically connected to the control end of the driving transistor; and an anode reset transistor, wherein an input end of the anode reset transistor is connected to the output end of the driving transistor and the first end of the compensating transistor, and an output end of the anode reset transistor is connected to the anode of the organic light emitting diode, wherein the compensating transistor and the initializing transistor are connected between the anode reset transistor and an initializing signal line.

12. The display device according to claim 11, further comprising a leakage preventing transistor, wherein a first end of the leakage preventing transistor is directly connected to the control end of the driving transistor, and a second end of the leakage preventing transistor is directly connected to the output end of the initializing transistor and the second end of the compensating transistor; and wherein at least one of the leakage preventing transistor, the initializing transistor, and the compensating transistor is a transistor with a metal oxide active layer.

13. The display device according to claim 12, wherein the leakage preventing transistor and the compensating transistor both are N type transistors with metal oxide active layers.

14. The display device according to claim 13, wherein a control end of the leakage preventing transistor and a control end of the compensating transistor both are connected to a first control signal line.

15. The display device according to claim 12, wherein the leakage preventing transistor is a N type transistor with a metal oxide active layer, and the compensating transistor is a P type transistor with a polysilicon active layer.

16. The display device according to claim 11, wherein the anode reset transistor is a N type transistor with a metal oxide active layer.

17. The display device according to claim 11, wherein the anode reset transistor and the initializing transistor both are P type transistors with polysilicon active layers, and a control end of the initializing transistor and a control end of the anode reset transistor both are connected to a second control signal line.

18. The display device according to claim 11, further comprising:

a switch transistor, wherein an input end of the switch transistor is connected to a data signal line, and an output end of the switch transistor is connected to an input end of the driving transistor;

a first light emitting control transistor, wherein an input end of the first light emitting control transistor is connected to a power signal line, and an output end of the first light emitting control transistor is connected to the input end of the driving transistor;

a second light emitting control transistor, wherein an input end of the second light emitting control transistor is connected to the output end of the driving transistor, the first end of the compensating transistor, and the input end of the anode reset transistor, and an output end of the second light emitting control transistor is connected to the anode of the organic light emitting diode; and a capacitor, wherein a first end of the capacitor is connected to the power signal line, and a second end of the capacitor is connected to the control end of the driving transistor.

19. The display device according to claim 18, wherein all the driving transistor, the switch transistor, the first light emitting control transistor, and the second light emitting control transistor are P type transistors with polysilicon active layers.

* * * * *